US007641335B2

(12) United States Patent
Chang

(10) Patent No.: US 7,641,335 B2
(45) Date of Patent: Jan. 5, 2010

(54) STABLE TITANIUM SPECTACLE FRAMES FOR TELEMICROSCOPES AND SURGICAL TELESCOPES

(75) Inventor: Byung Jin Chang, Ann Arbor, MI (US)

(73) Assignee: General Scientific Corporation, Ann Arbor, MI (US)

( * ) Notice: Subject to any disclaimer, the term of this patent is extended or adjusted under 35 U.S.C. 154(b) by 306 days.

(21) Appl. No.: 11/346,929

(22) Filed: Feb. 3, 2006

(65) Prior Publication Data
US 2006/0170860 A1    Aug. 3, 2006

Related U.S. Application Data

(60) Provisional application No. 60/649,368, filed on Feb. 3, 2005.

(51) Int. Cl.
*G02C 1/00*    (2006.01)
(52) U.S. Cl. ............................................ 351/158; 351/41

(58) Field of Classification Search .................. 351/41, 351/158, 57, 58, 47, 48, 124; 29/20
See application file for complete search history.

(56) References Cited

U.S. PATENT DOCUMENTS 5,583,583 A * 12/1996 Wilson ........................ 351/41

* cited by examiner

*Primary Examiner*—Hung X Dang
(74) *Attorney, Agent, or Firm*—Gifford, Krass, Sprinkle, Anderson & Citkowski, P.C.

(57) ABSTRACT

The entire front portion of eyeglass frames for medical, surgical or dental applications are constructed from a solid piece of machined metal, preferably titanium. This results in no welding of the nose bridge, resulting in a one-piece frame that is substantially more stable than existing designs. In a preferred embodiment, the basic shape is cast or stamped from plate stock from titanium, then machined down, if necessary, to a desired finished product. Holes are provided on the bridge portion for the mounting of medical, surgical or dental optics or other accessories.

6 Claims, 2 Drawing Sheets

STABLE TITANIUM SPECTACLE FRAMES FOR TELEMICROSCOPES AND SURGICAL TELESCOPES

REFERENCE TO RELATED APPLICATION

This application claims priority from U.S. Provisional Patent Application Ser. No. 60/649,368, filed Feb. 3, 2005, the entire content of which is incorporated herein by reference.

FIELD OF THE INVENTION

This invention relates generally to eyeglass frames and, in particular, to frames for medical/surgical/dental applications that have weld-less bridge portions, thereby eliminating weak points.

BACKGROUND OF THE INVENTION

As shown in FIG. 1, conventional eyeglass frames of the type used for surgical/dental telemicroscopes and surgical telescopes combine flat components, such as bridge 102, with wire frames 104, 106 to hold respective eyeglass lenses. This results in welded areas, depicted by the diagonal hashing, which, in turn, creates weak points and an unstable configuration. The need remains, therefore, for a more stable spectacle frame for telemicroscopes and surgical telescopes.

SUMMARY OF THE INVENTION

This invention resides in improved eyeglass frames for medical, surgical or dental applications, wherein the entire front portion of the eyeglass frames are constructed from a solid piece of machined metal, preferably titanium. This results in no welding of the nose bridge, resulting in a one-piece frame that is substantially more stable than existing designs. In a preferred embodiment, the basic shape is cast or stamped from plate stock from titanium, then machined down, if necessary, to a desired finished product. Holes are provided on the bridge portion for the mounting of medical, surgical or dental optics or other accessories.

A method of constructing eyeglass frames for medical, dental or surgical applications, comprises the steps of providing a blank of titanium or alloy thereof, stamping out eyeglass frames including lens rims joined by a bridge portion without the need for welding, and forming holes in the bridge portion for the mounting of optical or other accessories. An alternative method involves casting a set of eyeglass frames including lens rims joined by a bridge portion without the need for welding, and forming holes in the bridge portion for the mounting of optical or other accessories. Either approach may include the step of machining the frames after stamping.

The holes in the bridge portion may be formed during of after the stamping/casting operations.

DETAILED DESCRIPTION OF THE INVENTION

Figure 1:
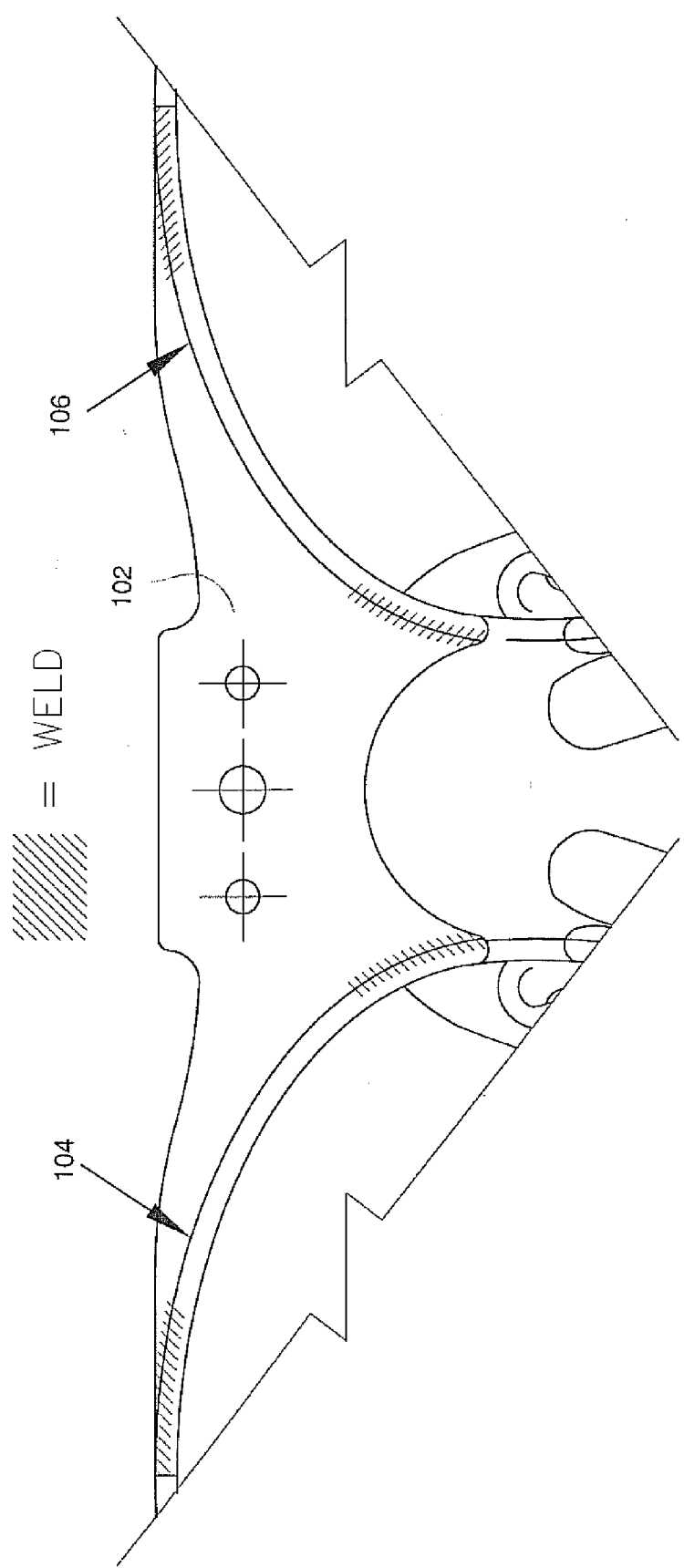
FIG. 1 shows conventional eyeglass frames of the type used for surgical/dental telemicroscopes.
Figure 2:
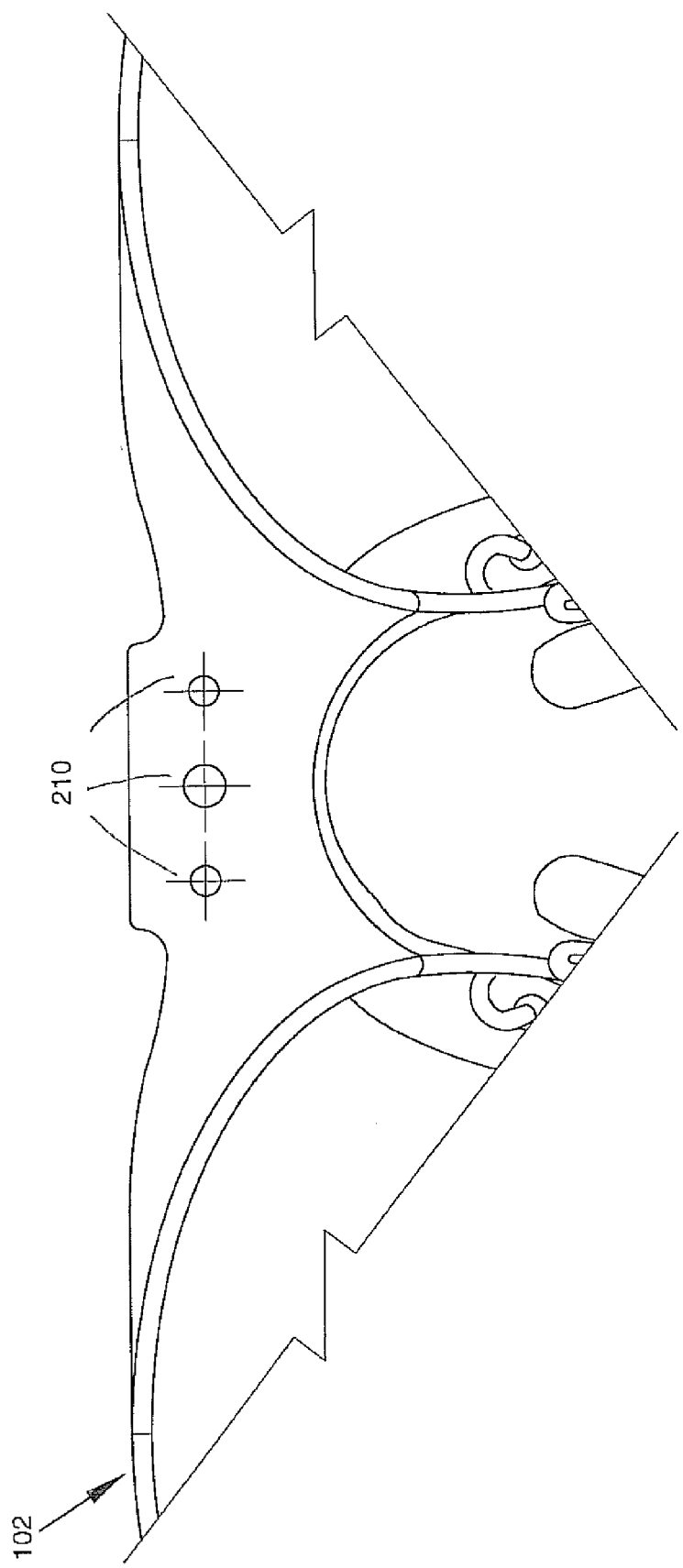
FIG. 2 shows machined eyeglass frames according to the invention.

Referring now to FIG. 2, there is shown an improved eyeglass frame according to the invention, wherein the entire front portion of the eyeglass frames are constructed from a solid piece of machined metal, preferably titanium. This results in no welding of the nose bridge, resulting in a one-piece wire frame 102 that is substantially more stable than existing designs. In a preferred embodiment, the basic shape is cast or stamped from plate stock from titanium, then machined down, if necessary, to a desired finished product. One or more holes 210 are provided for the mounting of medical, surgical or dental optics or other accessories.

I claim:

1. A machined, spectacle frame for telemicroscopes and surgical telescopes, the improvement comprising:
    a single piece of machined titanium, including an integrally-formed nose bridge portion requiring no welding thereof; and
    one or more holes through the bridge portion for the mounting of optical or other accessories.

2. The spectacle frame of claim 1, wherein the material used for the frame is composed of titanium.

3. A method of constructing the spectacle frame of claim 1, comprising the steps of:
    providing a blank of titanium or alloy thereof; and
    stamping out eyeglass frames including lens rims joined by a bridge portion without the need for welding; and
    forming holes in the bridge portion for the mounting of optical or other accessories.

4. The method of claim 3, including the step of machining the frames after stamping.

5. The method of claim 3, including the step of machining the frames after stamping.

6. A method of constructing the spectacle frame of claim 1, comprising the steps of:
    casting a set of eyeglass frames including lens rims joined by a bridge portion without the need for welding; and
    forming holes in the bridge portion for the mounting of optical or other accessories.

* * * * *

UNITED STATES PATENT AND TRADEMARK OFFICE
CERTIFICATE OF CORRECTION

PATENT NO. : 7,641,335 B2  Page 1 of 2
APPLICATION NO. : 11/346929
DATED : January 5, 2010
INVENTOR(S) : Byung J. Chang It is certified that error appears in the above-identified patent and that said Letters Patent is hereby corrected as shown below:

Delete the title page and substitute therefore the attached title page showing the corrected number of claims in the printed patent.

Column 2, line 1: After "during" replace "of" with --or--.

Column 2, lines 43-44: Delete claim 5 in its entirety.

Column 2, line 45: Replace "6" with --5--.

Signed and Sealed this

Twenty-third Day of February, 2010

David J. Kappos
*Director of the United States Patent and Trademark Office*

(12) United States Patent
Chang

(10) Patent No.: US 7,641,335 B2
(45) Date of Patent: Jan. 5, 2010

(54) STABLE TITANIUM SPECTACLE FRAMES FOR TELEMICROSCOPES AND SURGICAL TELESCOPES

(75) Inventor: Byung Jin Chang, Ann Arbor, MI (US)

(73) Assignee: General Scientific Corporation, Ann Arbor, MI (US)

( * ) Notice: Subject to any disclaimer, the term of this patent is extended or adjusted under 35 U.S.C. 154(b) by 306 days.

(21) Appl. No.: 11/346,929

(22) Filed: Feb. 3, 2006

(65) Prior Publication Data

US 2006/0170860 A1 Aug. 3, 2006

Related U.S. Application Data

(60) Provisional application No. 60/649,368, filed on Feb. 3, 2005.

(51) Int. Cl.
*G02C 1/00* (2006.01)
(52) U.S. Cl. .................................... 351/158; 351/41

(58) Field of Classification Search .............. 351/41, 351/158, 57, 58, 47, 48, 124; 29/20
See application file for complete search history.

(56) References Cited

U.S. PATENT DOCUMENTS 5,583,583 A * 12/1996 Wilson ..................... 351/41

* cited by examiner

*Primary Examiner*—Hung X Dang
(74) *Attorney, Agent, or Firm*—Gifford, Krass, Sprinkle, Anderson & Citkowski, P.C.

(57) ABSTRACT

The entire front portion of eyeglass frames for medical, surgical or dental applications are constructed from a solid piece of machined metal, preferably titanium. This results in no welding of the nose bridge, resulting in a one-piece frame that is substantially more stable than existing designs. In a preferred embodiment, the basic shape is cast or stamped from plate stock from titanium, then machined down, if necessary, to a desired finished product. Holes are provided on the bridge portion for the mounting of medical, surgical or dental optics or other accessories.

5 Claims, 2 Drawing Sheets

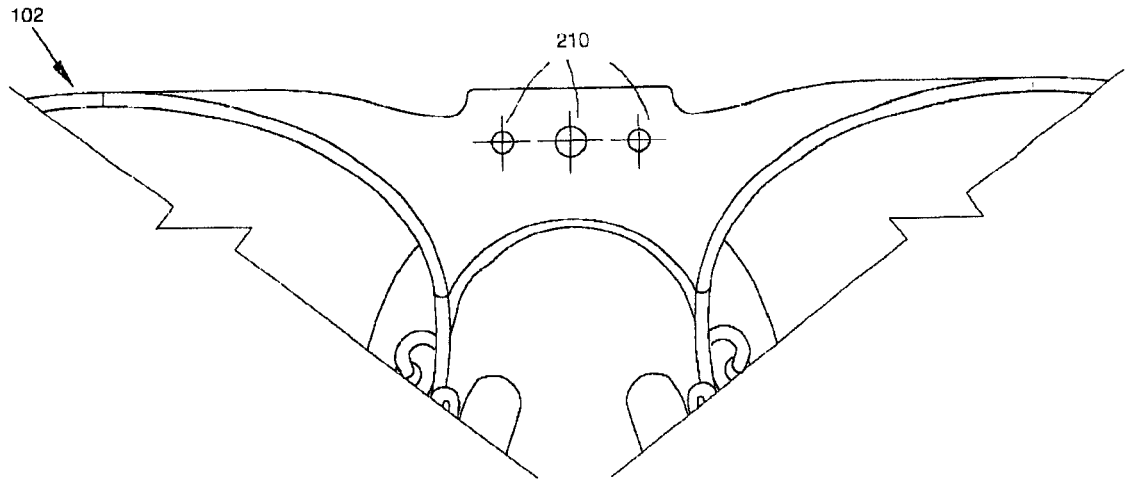

UNITED STATES PATENT AND TRADEMARK OFFICE
CERTIFICATE OF CORRECTION

PATENT NO. : 7,641,335 B2
APPLICATION NO. : 11/346929
DATED : January 5, 2010
INVENTOR(S) : Byung Jin Chang It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 439 days.

Signed and Sealed this

Sixteenth Day of November, 2010

David J. Kappos
*Director of the United States Patent and Trademark Office*